United States Patent
Holland et al.

(10) Patent No.: US 10,450,685 B2
(45) Date of Patent: Oct. 22, 2019

(54) METHODS FOR DISTRESSING FABRICS OR GARMENTS USING POLYSACCHARIDE PARTICLES

(71) Applicant: ARCHER DANIELS MIDLAND COMPANY, Decatur, IL (US)

(72) Inventors: Dave Holland, Westmount (CA); Denis Monette, Saint Bruno de Montarville (CA)

(73) Assignee: ARCHER DANIELS MIDLAND COMPANY, Decatur, IL (US)

( * ) Notice: Subject to any disclaimer, the term of this patent is extended or adjusted under 35 U.S.C. 154(b) by 0 days.

(21) Appl. No.: 15/032,813

(22) PCT Filed: Oct. 31, 2014

(86) PCT No.: PCT/US2014/063307
§ 371 (c)(1),
(2) Date: Apr. 28, 2016

(87) PCT Pub. No.: WO2015/066405
PCT Pub. Date: May 7, 2015

(65) Prior Publication Data
US 2016/0258096 A1    Sep. 8, 2016

Related U.S. Application Data

(60) Provisional application No. 61/897,884, filed on Oct. 31, 2013.

(51) Int. Cl.
| | | |
|---|---|---|
| *D06B 1/02* | (2006.01) | |
| *D06B 11/00* | (2006.01) | |
| *B24C 9/00* | (2006.01) | |
| *B24C 11/00* | (2006.01) | |
| *B24C 1/00* | (2006.01) | |

(52) U.S. Cl.
CPC ............... *D06B 1/02* (2013.01); *B24C 9/006* (2013.01); *B24C 11/00* (2013.01); *D06B 11/0096* (2013.01); *B24C 1/00* (2013.01); *Y02P 70/179* (2015.11)

(58) Field of Classification Search
CPC ......... C06B 1/02; C06B 11/0096; B24C 1/00; B24C 9/006; B24C 11/00; Y02P 70/179; D06B 1/02; D06B 11/0096
See application file for complete search history.

(56) References Cited

U.S. PATENT DOCUMENTS

| | | | |
|---|---|---|---|
| 4,951,366 A * | 8/1990 | Geller ................ | D06B 11/0096 26/28 |
| 5,066,335 A | 11/1991 | Lane et al. | |
| 5,066,355 A * | 11/1991 | Miyao ............... | H01L 21/02381 117/105 |
| 5,114,426 A * | 5/1992 | Milora ..................... | D06P 5/15 8/101 |
| 7,427,299 B2 | 9/2008 | Ziakas et al. | |
| 2004/0157532 A1* | 8/2004 | Koutlakis ............... | B24B 31/14 451/32 |
| 2004/0244652 A1* | 12/2004 | Drake ..................... | C04B 28/02 106/697 |
| 2007/0251021 A1 | 11/2007 | Schopke et al. | |
| 2008/0145353 A1 | 6/2008 | Amin et al. | |

FOREIGN PATENT DOCUMENTS

JP          S63243389 A1    10/1988

OTHER PUBLICATIONS

IPEA/US,Harold Pyon, International Preliminary Examining Authority, Patent Cooperation Treaty, pp. 1-40, Form PCT/IPEA/416, dated Oct. 26, 2015, USA.
International Searching Authority, Blaine R. Copenheaver, Patent Cooperation Treaty, Written Opinion nd International Search Report, pp. 1-13, Feb. 23, 2016, USA.

\* cited by examiner

*Primary Examiner* — Amina S Khan
(74) *Attorney, Agent, or Firm* — Andrew F. Nilles

(57) ABSTRACT

The present disclosure relates to methods for distressing an object by projecting polysaccharide particles onto a surface of the object. The present disclosure relates also to methods for cleaning the distressed fabric or garment and optionally methods for recycling the polysaccharide particles. In one embodiment, a method for distressing an object comprises suspending polysaccharide particles in a gas, creating a suspension, and projecting the suspension onto an object.

14 Claims, 7 Drawing Sheets

METHODS FOR DISTRESSING FABRICS OR GARMENTS USING POLYSACCHARIDE PARTICLES

CROSS-REFERENCE TO RELATED APPLICATIONS

This application is a national stage entry of International Application No. PCT/US2014/063307, filed Oct. 31, 2014, which itself claims priority to U.S. Provisional Patent Application No. 61/897,884, filed Oct. 31, 2013, each of the contents of the entirety of which are incorporated by this reference.

TECHNICAL FIELD

The present disclosure relates to methods for distressing an object, such as a fabric or a garment, by projecting polysaccharide particles onto the object. The present disclosure relates to polysaccharide particles to be used for distressing fabrics or garments. The present disclosure relates to fabrics or garments obtained by these methods.

BACKGROUND

Distressing fabrics, such as denim or leather, is a common textile process producing softness and a vintage look. Among techniques used to prematurely age fabrics, sandpaper, high pressure water jet, brushing, pumice washing, laser, chemical treatments and even firing gun shots at fabrics have been described.

Sandblasting is a process involving propelling sand or abrasive grits under high pressure and at high speed at fabrics. Sandblasting has been used since the 19$^{th}$ century to abrade surfaces. In 1994, Roberto Cavalli presented to the public the first sandblasted jeans, and this product has been very popular ever since. Sandblasting to distress fabrics was also described by Dupuit (FR 2750633A; FR 2750634A; FR 2750635A; FR 2628450A1), by Partouche (FR 2663652A), by Montesano (U.S. Pat. No. 5,505,739 A) and by Kirkland (US 2006/141,175 A).

It has been noted, however, that sandblasting can be damaging to the health of workers. For instance, they can inhale tiny particles of silica or cellulose fibers which enter the lungs and can cause byssinosis or silicosis, both potentially lethal pulmonary diseases. This concern even called for bans on the use of sand or silica for sandblasting of fabrics (*Deadly Denim, Sandblasting in the Bangladesh Garment Industry*, March 2012, Clean Clothes Campaign, International Secretariat).

Sand and silica have other disadvantages. Sand and silica have a Mohs hardness of 7.0, and therefore could damage metal parts, such as rivets or zippers, present on denim clothing creating a frosted, artificial look instead of shining brass. Aluminum oxide is also widely used in the textile industry as abrasive grit. However, aluminum oxide is characterized by a Mohs hardness of 9.0. This hardness aggressively abrades fabric, leading to poorer control of the distressing design. Use of sand, silica, or aluminum oxide could lead to overly distressed apparel, premature structural damages and an unnatural look.

Sodium bicarbonate has been disclosed as an alternative grit medium. Sodium bicarbonate has a higher density compared to organic-based blast media. However, sodium bicarbonate may be projected only once because of its fragility, thus making the distressing process very expensive.

Dry ice blasting has also been used to distress fabrics, but this requires high pressures (60-100 psi, supersonic), creating loud noises (130 dB) which require hearing protection. Dry ice blasting requires additional cold protection, as dry ice can cause severe frostbite. Moreover, dry ice cannot be reused, and the dry ice blasting machines are much less wear-resistant than sand blasting equipment.

Another alternative is air blasting. During the air blast distressing process, fine particles are created. The fine particles impact the fabric, discharging kinetic energy on the fabric. This energy breaks down the particles into smaller particles. These smaller particles infiltrate the fabric being treated. Subsequently, the fabric must be cleaned, preferably at low cost. Washing using an aqueous solution may be used. However, all known blast media are insoluble in water (with the exception of sodium bicarbonate), requiring thorough mixing to remove insoluble grits. Moreover, "hard" water insoluble blast media, such as sand (7 Mohs) and aluminum oxide (9 Mohs), cause premature wear to washing equipment, leading to increased maintenance fees.

The present disclosure addresses these problems and others, and provides further advantages that one of ordinary skill in the art will readily discern upon reading the following non-restrictive description that follows.

The present disclosure refers to a number of documents, the contents of which are herein incorporated by reference in their entirety.

SUMMARY

In one embodiment, a method for distressing an object comprises suspending polysaccharide particles in a gas, creating a suspension, and projecting the suspension onto an object.

In another embodiment, a method for disposal of polysaccharide particles comprising fibers or parts of a fabric or a garment, a solution comprising dissolved polysaccharide particles, or a combination of any thereof consists of burning, re-extruding, starching, sizing yarns, reusing to increase strength of textiles, degrading by micro-organisms, or filtering.

In another embodiment, a use of a polysaccharide particle to distress an object is disclosed.

In another embodiment, a distressed furniture produced by a method for distressing a furniture comprises projecting a polysaccharide particle onto a surface of the furniture.

In another embodiment, a distressed fabric or garment produced by a method for distressing a fabric or a garment comprises projecting a polysaccharide particle onto a surface of the fabric or the garment.

DETAILED DESCRIPTION

Figure 1:
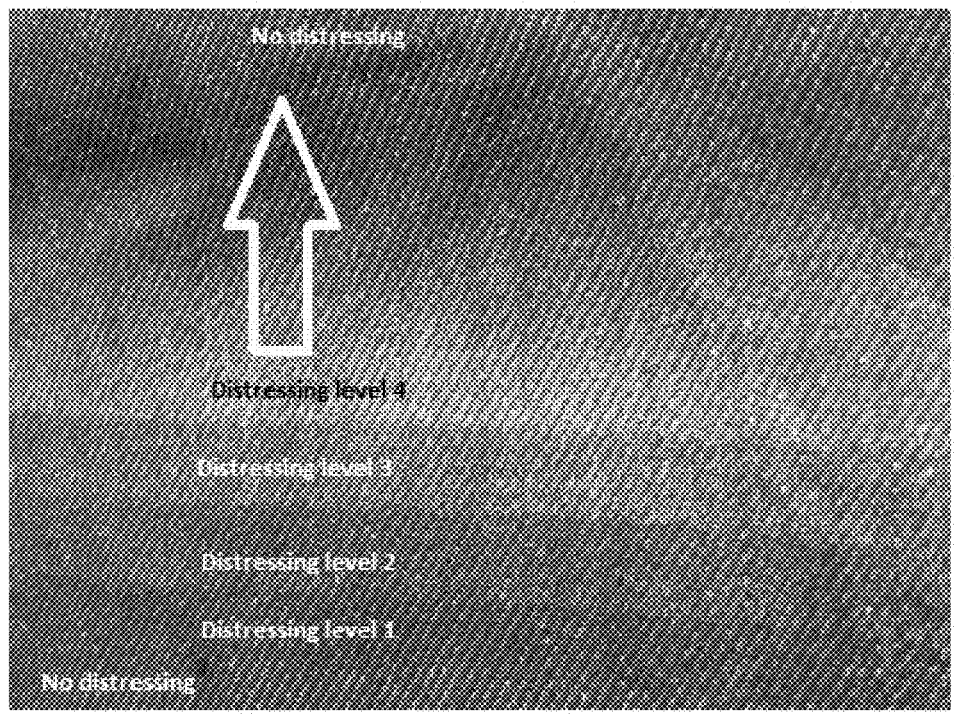
FIG. 1 illustrates a photograph of a denim fabric treated with a suspension of polysaccharide particles, with five abrasion degrees, according to an embodiment of the present disclosure.

The use of the word "a" or "an" when used in conjunction with the term "comprising" in the claims and/or the disclosure may mean "one", but it is also consistent with the meaning of "one or more", "at least one", and "one or more than one". Similarly, the word "another" may mean at least a second or more.

As used in this disclosure and claims, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements.

As used in this disclosure and claims, the term "about" is defined as being close to, as understood by one of ordinary skill in the art, and in a non-limiting embodiment the term is defined to be within 10%, preferably within 5%, more preferably within 1%, and most preferably within 0.5%.

As used in this disclosure, the term "percent" or "%" refers to a percentage by weight (i.e. % (w/w)), unless otherwise specified.

As described in this disclosure, the term "distressing" refers to artificial aging, damaging, tearing, or removing dye from an object to give a vintage look.

As used in this disclosure, the term "starch" refers to starch polymers, its components and its derivatives, such as starches, modified starches, amylopectin, modified amylopectin, amylose and modified amylose, from any botanical source. Typical, non-limiting sources of starch include wheat, corn, tapioca, potato, rice, oats, sorghum and barley, and combinations of any thereof.

As used in this disclosure, the terms "polysaccharide particle" and "polysaccharide particles" refer to what one of ordinary skill of the art would understand the terms to encompass, as well as the polysaccharide particles produced by the methods disclosed herein, including but not limited to glass-like polysaccharide particles, glass-like polysaccharide abrasive grit, and starch particles.

As used in this disclosure, the term "moisture content" refers to the amount of water (% w/w) contained in a solid.

As used in this disclosure, the term "granular material", "granules", "particles", "powders", "grains" or "dusts" refers to particulate matter in a finely divided state.

As used in this disclosure, the term "particle size" refers to the average dimension of a particle. The particle size may be directly determined using sieving methods, optical or scanning electron microscopes, as well as by other well-known methods. The particle size is often considered as the diameter of the particle.

It was unexpectedly discovered that objects such as fabrics, garments, or furniture may be distressed by using polysaccharide particles, which, in one embodiment, may comprise glass-like polysaccharide abrasive grit, and in another embodiment, may comprise starch particles. In another embodiment, the polysaccharide particles have a Mohs hardness of at least 1.5, or at least 2.0.

The methods for distressing an object of the present disclosure may comprise suspending polysaccharide particles in a gas to create a suspension, and projecting the suspension onto the object. Such methods may result in removing a fiber and/or part of the object, fabric, or garment from its surface. Objects such as fabrics or garments may be dyed in solutions, resulting in more dye present on their surfaces and less dye present on internal fibers or parts. The methods of the present disclosure may remove the most dyed fibers or parts from the objects at their surfaces. Removing fibers or parts of the object may result in the object whitening, dye fadeout and/or distressing. The methods of the present disclosure may also include cleaning the spent polysaccharide particles from the object, fabric, or garment, which may optimally be achieved by washing the object using an aqueous solution. In an embodiment, the polysaccharide particles may be dissolved in water, leaving 10% or less in hot water (at least about 40° C.) on a 60 Mesh (250 μm) sieve after 15 minutes.

In an aspect of the present disclosure, the use of polysaccharide particles to distress fabrics is disclosed. This use of polysaccharide particles may optionally also incorporate a dye for dyeing or embedding aesthetical or anti-counterfeit effects into the fabric. The fabrics so treated with a polysaccharide dye complex may then be easily detected by a light source in the case of a visible spectrum dye complex, or by a UV source in the case of a fluorescent dye complex.

In another aspect of the present disclosure, spent polysaccharide particles may be recycled or reused. Spent polysaccharide particles from the distressing methods may be used as fuel. Dissolved spent polysaccharide particles may be used to size yarns, give structural properties to fabrics (i.e. starching) or be transformed into bio-methane or ethanol. The washing solution containing dissolved spent polysaccharide particles may be filtered twice, recovering the fibers or parts of the fabrics or garments by microfiltration from a first filtration step and recovering the polysaccharide particles from a second filtration step.

The fabrics or garments distressed by the present methods have unique aesthetics. The fabrics or garments may be dye-faded, delaminated, torn, worn, ripped, softened, top-textile layer removed, punctured, or stripped. Typical usage patterns may be reproduced on the fabrics, such as whiskers, combs, stacks, or train tracks. Graphics such as letters, pictures, or designs, may also be reproduced by projecting the starch particles onto the fabric or garment. The methods of the present disclosure may also be fully automated using robots to perform the steps.

Figure 5:
FIG. 5 illustrates a micrograph of polysaccharide particles, according to an embodiment of the present disclosure.

Glass-like polysaccharides include a class of amorphous polysaccharides which are dried and cooled to keep their glassy state. Typically, a polysaccharide is made molten in water; it then loses its crystalline structure, allowing water occlusion in an amorphous state or gel. Once molten, the polysaccharide is cooled and dried to a moisture content ranging from about 5% to about 15%, more typically ranging from about 10% to about 15%. The polysaccharide is subsequently ground into abrasive grit particles, also referred to as polysaccharide particles, and also having a moisture content ranging from about 5% to about 15%, more typically ranging from about 10% to about 15%. Because of this glassy-state molecular configuration, glass-like polysaccharides have the aspect of broken glass, as depicted by the polysaccharide particles in FIG. 5. Moisture content will influence elasticity and compaction resistance of the glass-like polysaccharide abrasive grit. The more moisture the glass-like polysaccharide has, the more compaction and stress it may sustain. This property allows the glass-like polysaccharide abrasive grit to be used in more cycles than aluminum oxide, corncob, sand, or walnut shells.

A non-limiting example of a source of such a glass-like polysaccharide is starch. Starch exhibits a semi-crystalline behavior in its native granule state. However, starch becomes amorphous upon heating or upon alkaline treatment in water through a process called gelatinization. A non-limiting method for formation of polysaccharide particles involves heating starch. A convenient way to heat starch is by using an extruder, as the extruder will gelatinize the starch at a high density and shape the polysaccharide into pellets. Non-limiting examples of such extruders include single screw extruders, twin screw extruders, and Buss-Kneader extruders. For distressing fabrics, starch should not be pre-gelatinized above a temperature which would cause the water to spontaneously evaporate and further cause expansion. A typical temperature for heating the polysaccharide is about 105° C. or less at about 101.325 kPa, thereby keeping the specific density of the resulting polysaccharide pellets or particles derived therefrom between about 1.0 $g/cm^3$ and about 2.0 $g/cm^3$, in a non-expanded state. More typically, the specific density of the polysaccharide pellets or particles derived therefrom ranges from about 1.35 $g/cm^3$ to about 1.55 $g/cm^3$. The polysaccharide pellets or particles derived therefrom are characterized by an apparent Mohs Hardness of at least about 1.5, or about 2.0, or a Shore Hardness ranging from about 60 to about 100, D scale. The typical temperature used to manufacture such polysaccharide pellets or particles derived therefrom ranges from about 55° C. to about 105° C. Non-limiting examples of starches include modified starches and native starches from any botanical origin, such as wheat, corn, waxy or high amylose corn, tapioca, potato, rice, oats, sorghum and barley.

Once extruded, polysaccharide pellets are ground into abrasive grits, also referred to as polysaccharide particles, by using a grinder, such as described by Chevigny (WO/2006/074556). The polysaccharide particles are characterized by a particle size ranging from about 177 μm to about 2000 μm. A non-limiting example of a size distribution for polysaccharide particles comprises more than 20% of particles having a size greater than 841 μm (20 Mesh); more than 25% of particles having a size less than 841 μm but greater than 595 μm (30 Mesh); 15-25% of particles having a size less than 595 μm but more than 400 μm; and at most 7% of particles having a size ranging between 177 μm and 400 μm.

Figure 11:
FIG. 11 illustrates a photograph of a 60 Mesh sieve wherein the polysaccharide particles were solubilized, according to an embodiment of the present disclosure.

The polysaccharide particles of the present disclosure may be water soluble. To determine if the polysaccharide particles are water soluble, polysaccharide particles are placed in hot water (at least about 40° C.) on a 60 Mesh (250 μm) screen for about 15 minutes. If more than about 90% (w/w) of the slurry passes through the mesh after 15 minutes, the polysaccharide particles are considered water soluble, as depicted by FIG. 11. This water solubility may help remove the spent polysaccharide particles from the treated fabric or garment during cleaning.

The methods of the present disclosure include forming a suspension of polysaccharide particles in a gas. The gas could be any type of gas; a non-limiting example due to convenience is air. The pressure used to distress objects typically ranges from about 10 psi to about 30 psi (69 kPa to 207 kPa), more typically from about 10-20 psi (69 kPa to 138 kPa). The suspension may be conveyed in a nozzle. The polysaccharide particles are typically projected onto a fabric or garment using this nozzle. One skilled in the art of air-blasting will select a proper nozzle and feed rate for purposes of productivity and/or precision, as described by Settles G. S, Garg S. Journal of Thermal Spray Technology, volume 5(1) March 1996-35. Typically, the polysaccharide particles are propelled at subsonic speed, for a better control of the distressing process, allowing for multiple degrees of distressing, depicted by FIG. 1.

Typical projection rates range from about 0.5 g/minute (for microblasting) to about 5000 g/minute, depending on the nozzle opening. The optimum angle to distress fabrics or garments using polysaccharide particles ranges from about 30 to about 90 degrees. The nozzle distance from the fabric or garment typically ranges from about 8 cm to about 30 cm. It should be noted that cotton may become distressed more quickly than synthetic textiles, such as polyester.

Figure 8:
FIG. 8 illustrates a photograph of a pair of jeans distressed with a suspension of polysaccharide particles, wherein regions of the jeans were more exposed to the polysaccharide particles using pins and clips, with various distressing patterns, such as whiskers and rails, according to an embodiment of the present disclosure.

The nozzle may be handheld or automated. Commonly, mannequins and pins or clips may be used to expose the fabric or garment to the polysaccharide particles to create "naturally" distressed patterns such as whiskers, combs, stacks, or train tracks. Tracks and whiskers are depicted by FIG. 8. The distressing patterns may also look like imprints, such as letters, designs or pictures. Stencils may also be used.

The polysaccharide particles of the present disclosure may be recycled. Once projected, the spent polysaccharide particles may be removed from the fabric, re-suspended and re-projected until most of the particles reach an average particle size of about 120 Mesh (125 μm) or less using cyclones or screens. This process, known as cycling, may be done from 15 to 30 times (cycles) using polysaccharide particles. As a comparison, aluminum oxide can be cycled only 8 times, corncob 5 times, and walnut shells 6 times. This is a significant improvement, as use of polysaccharide particles may allow for distressing more objects, garments or fabric with the same amount of abrasive grit.

A composition of the polysaccharide particles of the present disclosure also may include other abrasive grits, such as aluminum oxide, silica, sand, agricultural residues, acrylates, and combinations of any thereof. The methods of the present disclosure also may be combined with any other types of distressing techniques, such as use of a laser.

Projecting the polysaccharide particles may be done on many fabrics and garments. Fabrics, such as those made of cotton (and more specifically denim and jeans), polyester, polyamides, viscose, rayon, Lyocell™, wool, and Elastane, may be used. Garments that are distressed typically include, but are not limited to, pants, jackets, shirts, hats, shorts, coats, bags, vests, belts.

Figure 7:
FIG. 7 illustrates a photograph of a leather garment, distressed with a suspension of polysaccharide particles, according to an embodiment of the present disclosure.

The methods of the present disclosure may also be used on garments, boots, or furniture. FIG. 7 depicts distressed leather, which was distressed using a suspension of polysaccharide particles. The methods of the present disclosure may also be used in the tanning process on top grain, nubuck, suede, or corrected grain tanning, replacing silica abrasion (sanding). The methods of the present disclosure may also be used to distress PVC and latex.

Figure 4:
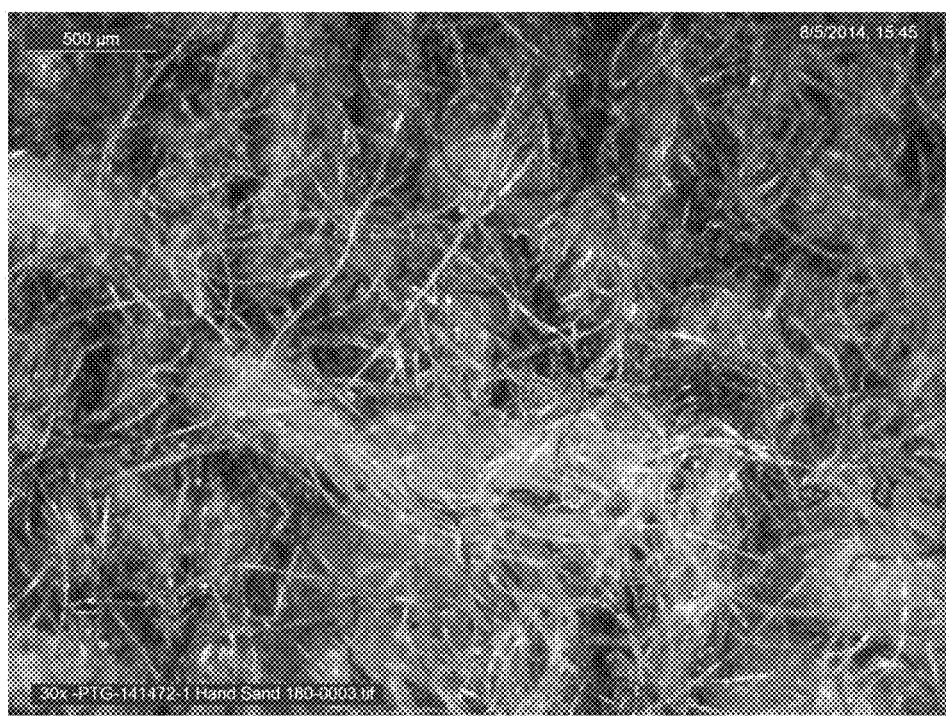
FIG. 4 illustrates a micrograph of a hand sanded denim fabric, as a comparative example to the present disclosure.

The methods of the present disclosure have the advantage of causing less damage to fibers than silica, aluminum oxide, corncobs, walnut shells, or hand sanding, as polysaccharide particles are much less aggressive compared to other abrading media. The methods of the present disclosure efficiently remove dyed parts or dyed fibers of an object, resulting in a distressed appearance while being less damaging to the structural integrity of the object. The methods of the present disclosure are also less damaging to stitches, rivets, zippers, buttons and seams, which is especially useful for leather and denim objects. The methods of the present disclosure allow for better control of the "distressing degree" than hand sanding (FIG. 4).

Figure 3:
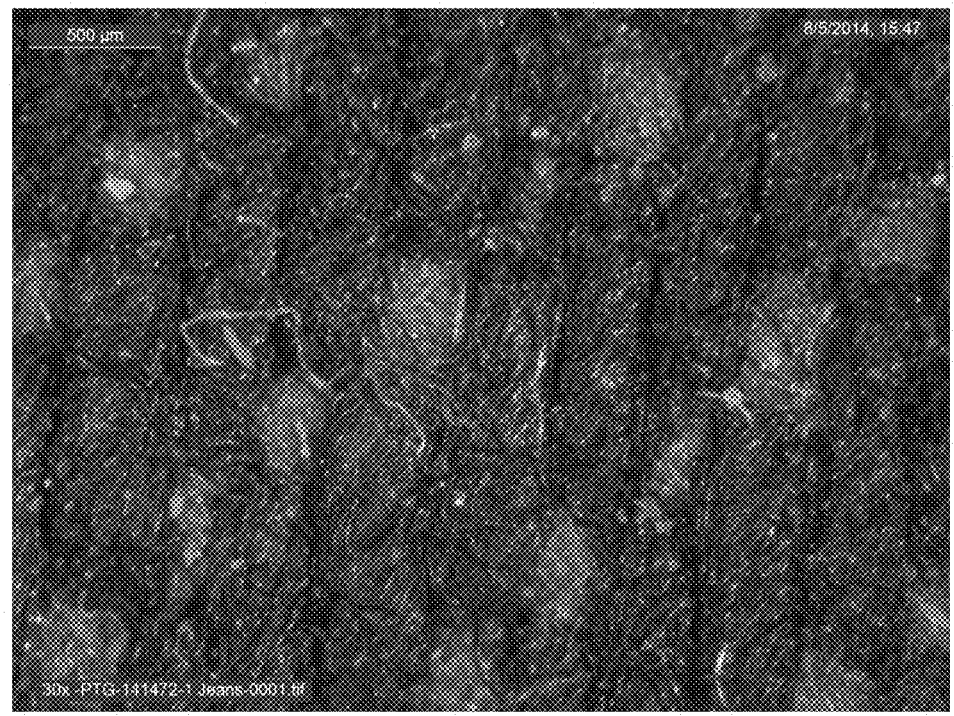
FIG. 3 illustrates a micrograph of a pristine denim fabric without any distressing treatment, as a comparative example to the present disclosure.
Figure 6:
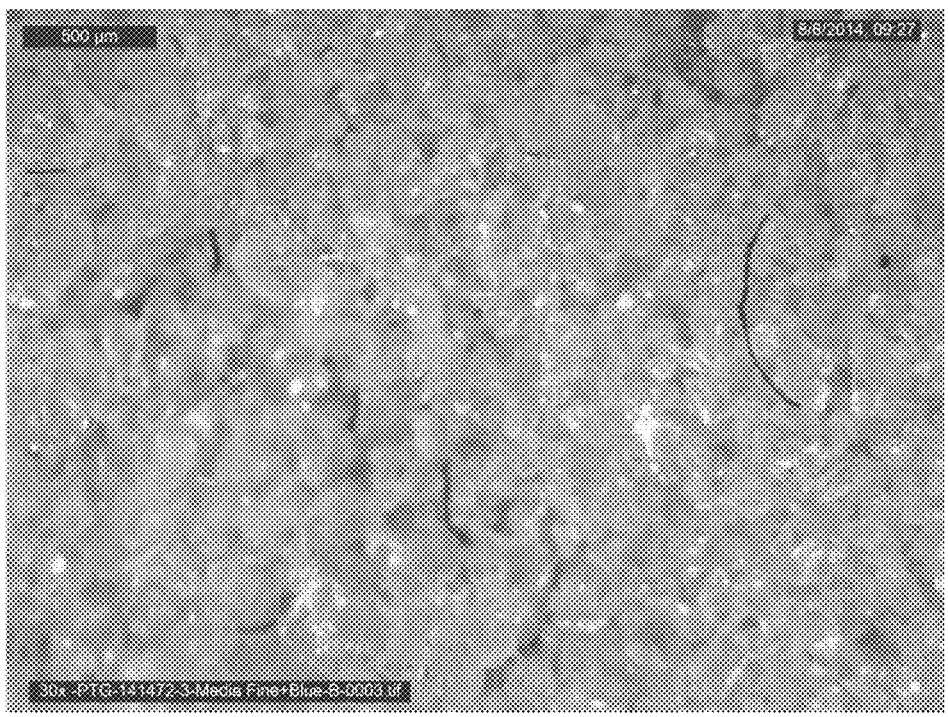
FIG. 6 illustrates a micrograph of spent polysaccharide particles (<125 μm), comprising dyed blue fibers, after the distressing method, according to an embodiment of the present disclosure.

When a fabric or garment is dyed in a solution, the outer fibers or parts become more dyed, leaving the inner parts less dyed, as depicted by FIG. 3. When polysaccharide particles impact the fabric, the most dyed fibers (or parts) of the fabric are removed, as depicted by FIG. 6, and as shown by blue fibers found in spent polysaccharide particles (<125 μm). Dyes such as aniline dye (mauveine), blue, brown, or black may be easily removed from fabric or garments using polysaccharide particles.

Figure 2:
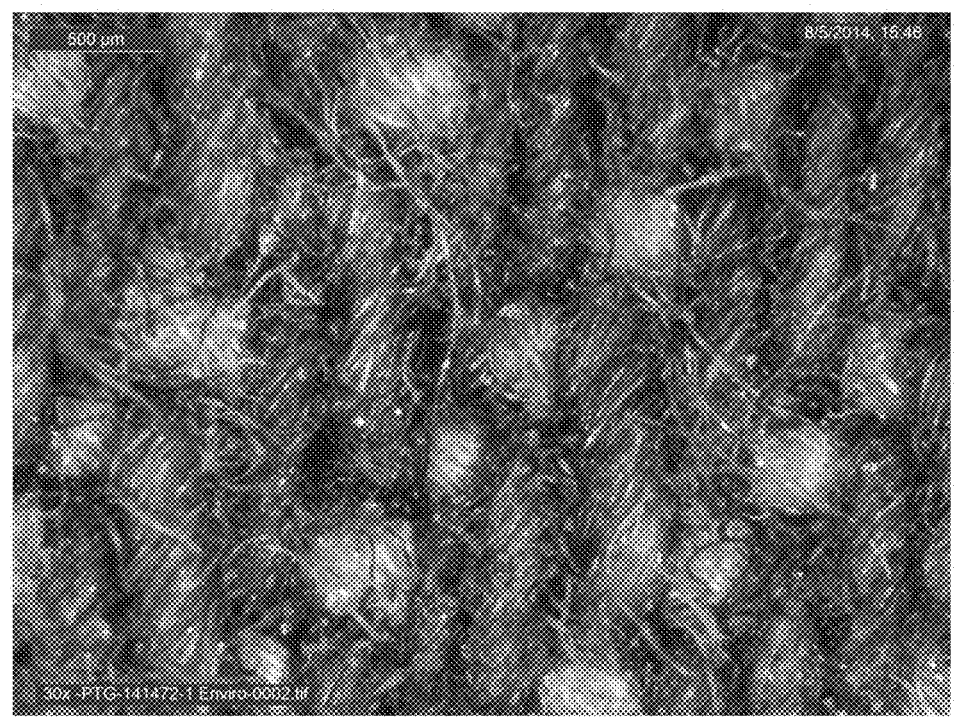
FIG. 2 illustrates a micrograph of a denim fabric treated with a suspension of polysaccharide particles, according to an embodiment of the present disclosure.
Figure 9:
FIG. 9 illustrates a side elevational view photograph of a pristine pair of jeans, above two books, illustrating the jeans' roughness without a distressing treatment, as a comparative example to the present disclosure.
Figure 10:
FIG. 10 illustrates a side elevational view photograph of a distressed pair of jeans, above two books, distressed with polysaccharide particles, illustrating the jeans' softness from the distressing treatment, according to an embodiment of the present disclosure.

The methods of the present invention may result in a paler, distressed fabric, as depicted by FIG. 2. This distressed fabric may comprise protruding fibers, creating a softness typical of used denims. However, the methods of the present disclosure create fewer protruding fibers than hand sanded fabrics, as depicted by FIG. 4. The methods of the present disclosure are also much less time consuming. Moreover, the distressed fabrics resulting from the methods of the present disclosure are much more flexible over the distressed area, creating a U-shaped arch between two raised points, as depicted by FIG. 10. Untreated fabrics do not create such an arch, as depicted by FIG. 9.

Figure 13:
FIG. 13 illustrates a photograph of distressed denim treated with a suspension of polysaccharide dye complex comprising a fluorescent dye, under visible light, according to an embodiment of the present disclosure.
Figure 14:
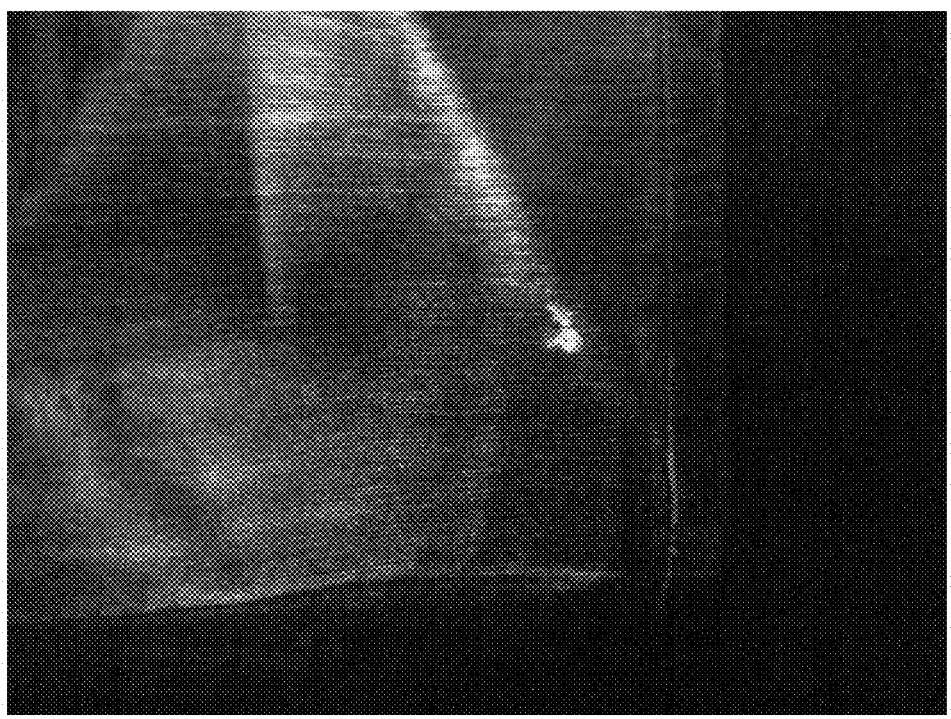
FIG. 14 illustrates a photograph of the distressed denim of FIG. 13, which was treated with a suspension of polysaccharide dye complex comprising a fluorescent dye, under a UV light source, according to an embodiment of the present disclosure.

In an embodiment of the present invention, the polysaccharide particles may optionally incorporate a dye, forming a polysaccharide dye complex. The dye may be used for embedding aesthetics or anti-counterfeit effects in the fabric. The dye may be added to the polysaccharide, to the the water added during the process of manufacturing the polysaccharide particles, or to both. The use of a polysaccharide dye complex on fabric may achieve distressing or printing. As a non-limiting example, fluorescent dyes may be printed on fabric. The fabric will exhibit no significant differences than a distressed fabric under visible light (FIG. 13). However, under a UV light source, the fabric will fluoresce (FIG. 14).

Figure 12:
FIG. 12 illustrates a photograph of a denim fabric treated with a suspension of polysaccharide dye complex (turmeric extract), under a UV light source, according to an embodiment of the present disclosure.

This technique may have a high level of accuracy, allowing dot-per-dot coloration, used typically in anti-counterfeit measures (FIG. 12). A non-limiting example of such a fluorescent dye is turmeric extract.

Once treated with the polysaccharide particles, tiny particles penetrate the fabric or the garment and accumulate in pockets or holes. It is therefore important to clean the distressed fabric. The polysaccharide particles of the present disclosure have the advantage over other types of abrasive grits of being water soluble. This property makes the process of cleaning the distressed fabric or garment easier, as the distressed fabric or garment may be effectively washed using water or an aqueous solution. Such aqueous solutions may include enzymes and/or surfactants, such as amylase, known to degrade starch.

One of the advantages of the present invention is that polysaccharide particles or washing solutions may be recycled. The spent polysaccharide particles comprising fibers may be burned directly as fuel. The spent polysaccharide particles may also be re-moisturized to about 20-30% and re-extruded to obtain polysaccharide pellets, which may be ground into polysaccharide particles. Washing solutions comprising the dissolved polysaccharide particles may be used to size yarn (such as described in EP1735494A1) and textiles. Such washing solutions may be used to give strength to fabrics (starching). Such washing solutions may also be degraded into sugars by microorganisms and used as energy sources, for example through fermentation to yield $C_1$-$C_4$ alcohols which may be recovered by distillation. The dissolved polysaccharide particles may also be anaerobically fermented to yield bio-methane. The washing solution may also be dual filtered, with a microfiltration step to remove fibers or parts of the fabric/garment and a nano-filtration or ultra-filtration step to recover the dissolved polysaccharide particles, which optionally may be further recycled through drying and extrusion, as previously discussed.

The invention is further explained by use of the following exemplary embodiments.

Example 1

Polysaccharide particles, e.g., wheat starch glass-like polysaccharide abrasive grit (Trade Name Envirostrip Wheat Starch 12/80) was obtained from Archer Daniels Midland Company, Decatur, Ill. For FIG. 12, the polysaccharide pellets were immersed in an isopropanol/turmeric extract solution for 48 hours before drying and grinding into polysaccharide particles. For FIGS. 13-14, the polysaccharide pellets were immersed with 1% of Fluorescent Penetrant 985P14 (Chemetall Oakite, New Providence, N.J.), dried and ground into polysaccharide particles.

Fabrics or garments were distressed using a modified Pauli Systems PRAM 31 hand cabinet. The cabinet contained a computer-controlled x-y table to conduct precise automated tests and other features to facilitate the rapid performance characterization of experimental abrasives. The polysaccharide particles were tested initially in small 30-lb batches in the hand cabinet.

The blast pressure was continuously monitored at the pressure pot by a digital pressure gauge. The nozzle pressure was verified at the beginning of every blast cycle by two different digital needle gauges. Media flow was accurately controlled using a Pauli Systems Accu-Flow Valve, which was computer controlled and, for this work, was adjusted to a setting of 60 (corresponding to about 2.27 kg/min or 5 lbs/min) on the digital display for all tests. The blast time and the corresponding flow rate were verified for every blast cycle.

Using the blast cabinet, each of the fabrics was blasted for 5-60 seconds. The nozzle pressure was 15 psi (103 kPa) for all tests. The standoff distance was 6-8 inches (15-20 cm), and the blast angle was 45-60 degrees. A –6 (⅜ of an inch or 375 mm) nozzle was used. The fabrics used were denim (FIGS. 1, 2, 6, 8, 10 and 12) and leather (FIG. 7).

FIG. 7 illustrates half of a pair of jeans treated with the method of the present disclosure, reproducing typical usage wear, such as whiskers and rails. The pair of jeans was distressed using a mannequin and pins.

FIG. 11 illustrates the water solubility of the polysaccharide particles, as more than 90% passed through a 60 Mesh screen using water heated to 65° C.

The present invention has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiments, but rather by the appended claims as originally filed.

The invention claimed is:

1. A method for distressing a fabric or a garment, the method comprising:
suspending polysaccharide particles having a moisture content ranging from about 10% to about 15% in a gas, creating a suspension;
projecting the suspension onto a surface of the fabric or the garment at a pressure ranging from about 69 kPa to about 207 kPa; and
removing the polysaccharide particles from the fabric or the garment with water or an aqueous solution, thus degrading starch in the polysaccharide particles;
wherein the polysaccharide particles have a Mohs hardness of at least 1.5 and are water soluble;
wherein the polysaccharide particles comprise a dye and form a polysaccharide dye complex.

2. The method according to claim 1, wherein the polysaccharide particles are pregelatinized.

3. The method according to claim 1, wherein the polysaccharide particles comprise glass-like polysaccharide abrasive grit.

4. The method according to claim 1, wherein the polysaccharide particles comprise starch.

5. The method according to claim 1, wherein the method removes a fiber, a part of the fabric or the garment, or a combination of any thereof.

6. The method according to claim 5, wherein the fiber or the part of the fabric or the garment comprises a dye.

7. The method according to claim 1, wherein the polysaccharide particles are characterized by a specific density ranging from about 1.0 g/cm$^3$ to about 2.0 g/cm$^3$.

8. The method according to claim 1, wherein the polysaccharide particles have a particle size ranging from about 177 μm to about 2000 μm.

9. The method according to claim 1, wherein the polysaccharide dye complex comprises a fluorescent agent.

10. The method according to claim 1, further comprising re-projecting the polysaccharide particles onto the fabric or the garment.

11. The method according to claim 10, wherein the polysaccharide particles are re-projected onto the fabric or the garment from about 15 times to about 30 times.

12. The method according to claim 10, wherein the polysaccharide particles are re-projected until the particle size reaches an average particle size of about 125 μm or less.

13. A method for distressing furniture, the method comprising:
suspending polysaccharide particles having a moisture content ranging from about 10% to about 15% in a gas, creating a suspension; and
projecting the suspension onto a surface of the furniture at a pressure ranging from about 69 kPa to about 207 kPa;
wherein the polysaccharide particles have a Mohs hardness of at least 1.5;
wherein the polysaccharide particles comprise a dye and form a polysaccharide dye complex.

14. A method for distressing a fabric or a garment, the method comprising:
suspending polysaccharide particles and another abrasive grit in a gas, creating a suspension; and
projecting the suspension onto a surface of the fabric or the garment;
wherein the another abrasive grit is selected from the group consisting of aluminum oxide, silica, sand, agricultural residues, acrylates, and combinations of any thereof;
wherein the polysaccharide particles comprise a dye and form a polysaccharide dye complex.

* * * * *